May 19, 1936. L. G. DE KERMOR 2,041,116
ELECTRIC STEAM CONDENSER
Filed April 4, 1934 4 Sheets-Sheet 1

INVENTOR
Louis G. de Kermor.
BY Frederick W. Barker
ATTORNEY

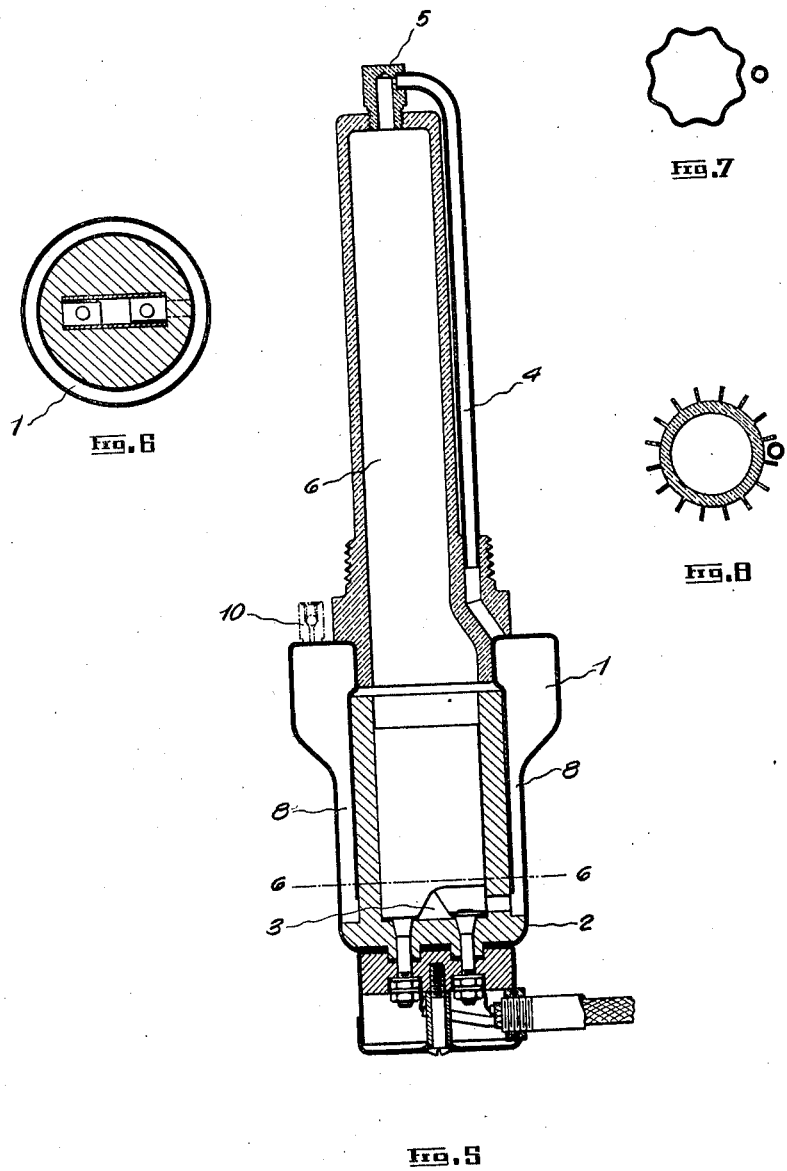

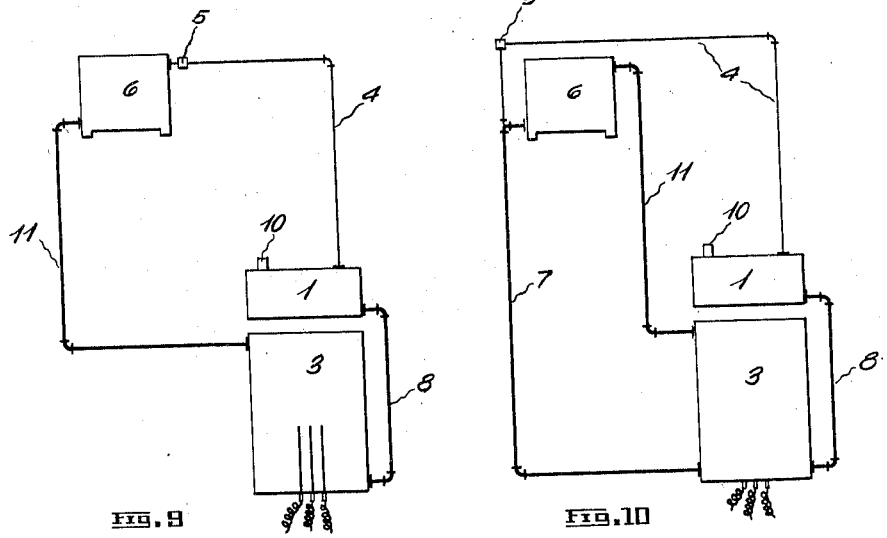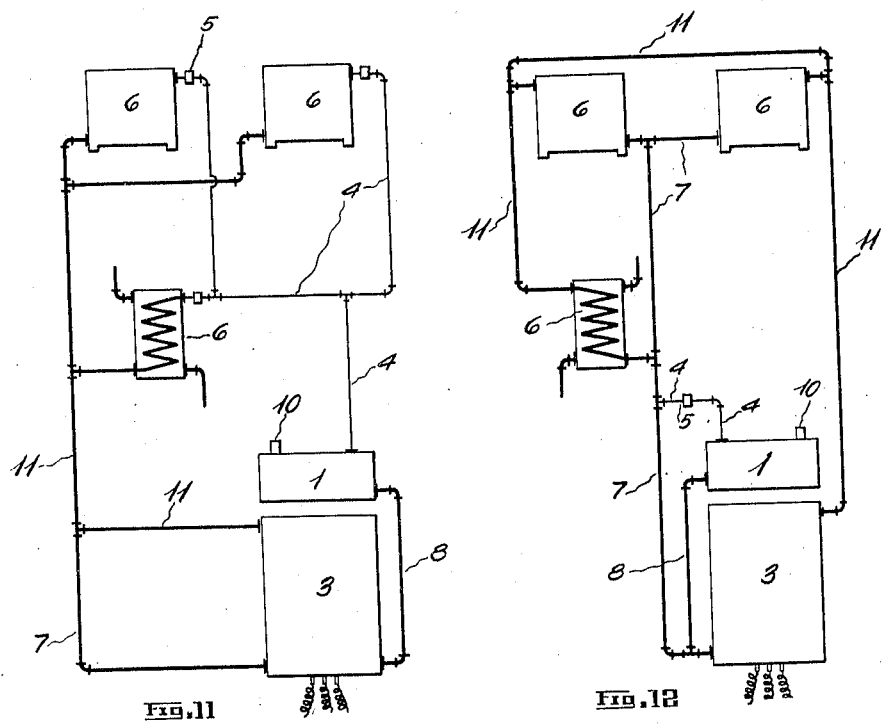

May 19, 1936.    L. G. DE KERMOR    2,041,116
ELECTRIC STEAM CONDENSER
Filed April 4, 1934    4 Sheets-Sheet 4

INVENTOR
Louis G. de Kermor,
BY
Frederick W. Barker
ATTORNEY

Patented May 19, 1936

2,041,116

UNITED STATES PATENT OFFICE 2,041,116

ELECTRIC STEAM CONDENSER

Louis G. de Kermor, Edmonton, Alberta, Canada

Application April 4, 1934, Serial No. 718,888

5 Claims. (Cl. 219—40)

This invention relates to electric steam condensers of the electrolyte or water resistance type and to their application to the heating of any surrounding medium such as air, gases, liquids, etc., or any combination thereof.

Although the passage of an electric current through an electrolyte for the production of steam and/or vapor has been found to be practical and highly efficient, the need of intricate auxiliary devices for the control of temperature, pressure, etc., and most important of all, for the conductivity of, and the consequent current density through the electrolyte has caused this method of steam and/or vapor production to be almost entirely discarded in the type of apparatus used in homes and small industries.

The main object of this invention is to provide an electric steam condenser of the class described which is entirely self contained, with an electrolyte of fixed conductivity sealed in, thereby eliminating all need for replacement or adjustment,—and self controlled with no moving part of any kind whatsoever.

The heat producing element can be operated with single or with multi-phase current, according to the power available, and the electrodes can be either flat, tubular, or of any other shape and connected from the top, bottom or side, as best suited to the current, voltage, and mechanical requirements of the construction.

In an electric steam condenser of my invention, the quantity of steam generated is in direct relation to the amount of electrical energy consumed, which in turn is proportionate to the surface presented by the electrode as immersed in the electrolyte.

Other features and advantages of my invention will hereinafter appear.

In the drawings:—

Fig. 5 is a vertical sectional view of a further modification.

Fig. 6 is a section on the line 6—6 of Fig. 5.

Figs. 7 and 8 are respectively views in cross-section of the condenser element, showing variations in the shape of the heat transferring surface.

Figure 13:
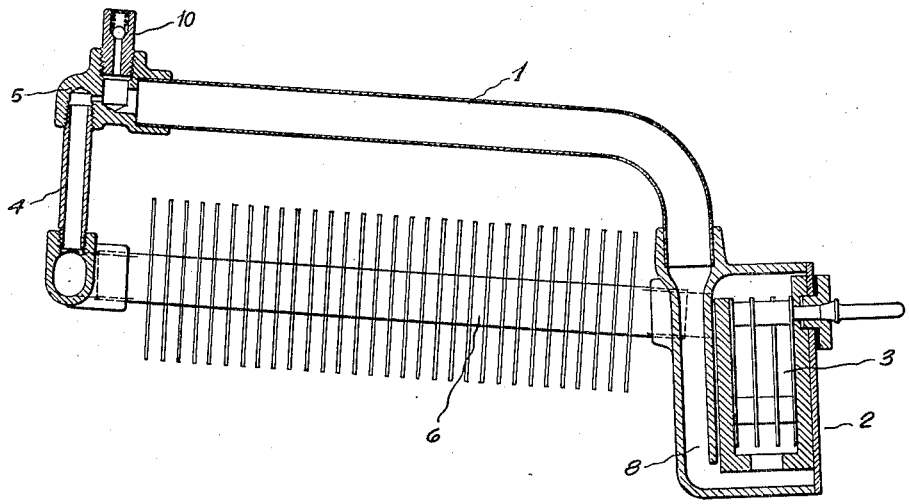
Figure 14:
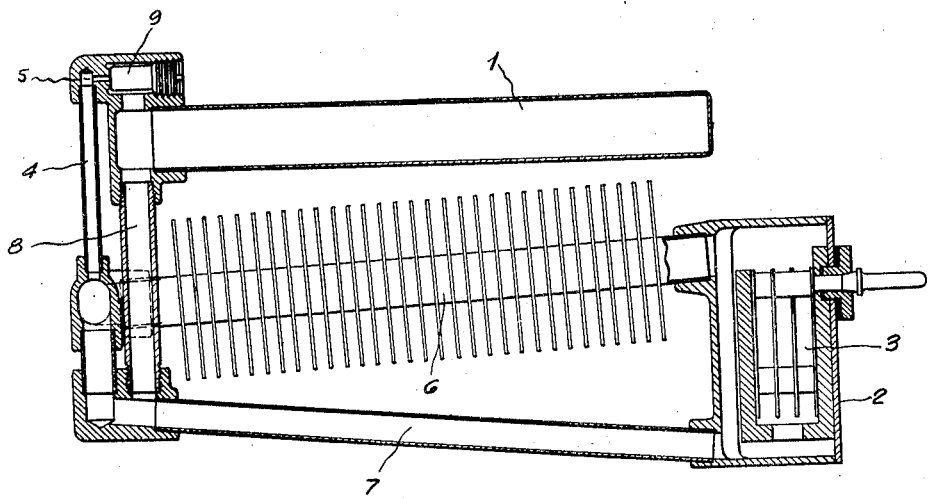

Figs. 9, 10, 11 and 12 are respectively diagrammatic views showing variations in the manner in which the electric steam condenser of the sealed type can be amplified by the use of a group of condenser cores of both the space and the liquid cooling types, but with only one heat generating element, one common air line, and one steam line, with or without return pipes, and Figs. 13 and 14 are respectively side sectional elevations showing further modified forms of my invention.

Figure 1:
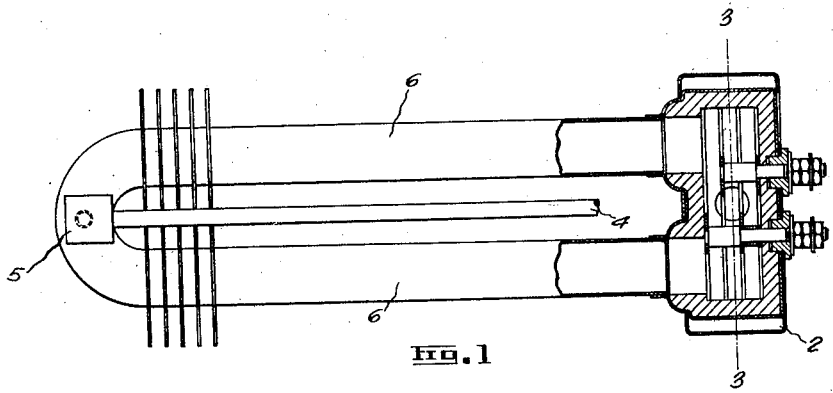
Figure 1 is a plan view partly in section showing one form of my invention.
Figure 2:
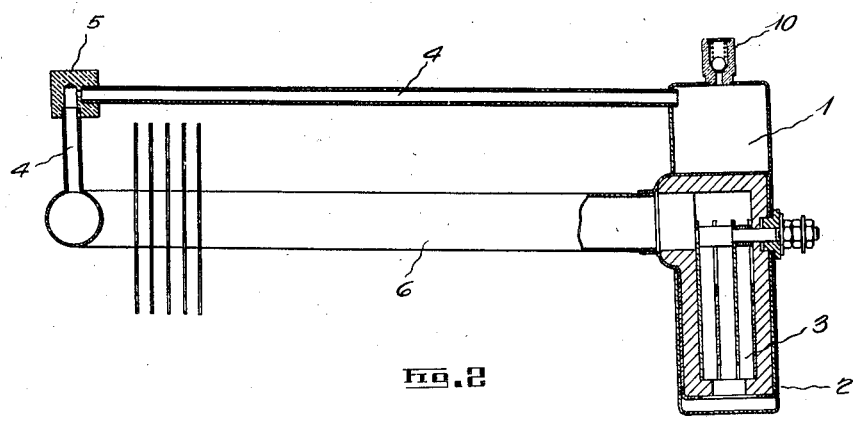
Fig. 2 is a sectional elevation thereof.
Figures 3, 4:
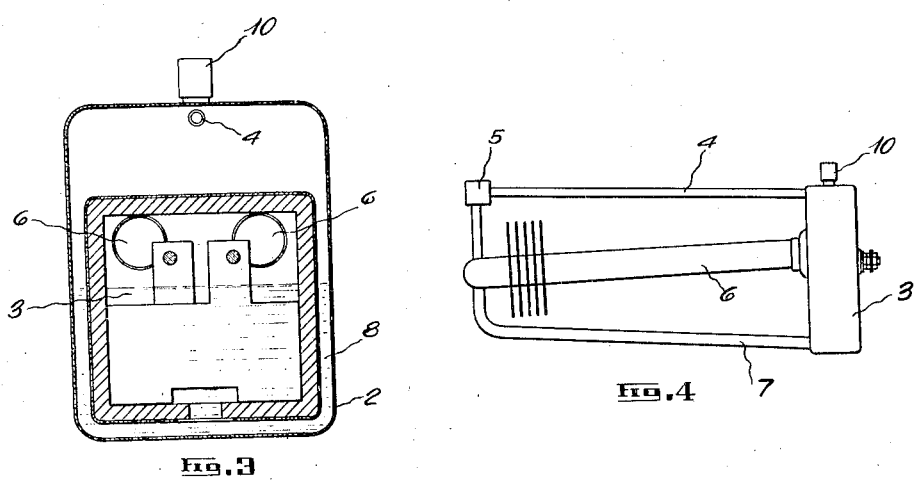
Fig. 3 is a section on the line 3—3 of Fig. 1.
Fig. 4 is a side elevation of a modified form of the invention.

As illustrating some applications of my new invention and method of control, Figs. 1, 2 and 3 show plan, side and end views of one form of construction for an electric steam condenser as applied to air, gas or space heating, wherein a compression chamber 1 is located above but within the casing 2 that also contains the steam generating chamber 3, an air line 4, provided with a throttling element 5, being inserted between the condenser core 6 and the compression chamber.

In this form of the invention the condenser core, which is shown of the fin type variety, but could be of any other type, may be so inclined as to permit the condensating electrolyte to return directly to the generating chamber.

In Fig. 4 the same construction is shown, but with the condenser core 6 inclined in the opposite direction, and an additional pipe 7, inclined downwardly toward the generating chamber 3, is provided for the return of the condensate.

The generating chamber 3 is in communication with the compressor 1 by means of a passageway 8.

The operation and method of self regulation of this electric steam condenser are as follows:

The condenser having been sealed after removal or addition of an amount of air proportionate to the predetermined maximum operating pressure, and the necessary quantity of electrolyte having been introduced, then the current is switched on. The passage of the current through the electrolyte in the generating chamber 3 causes the said electrolyte to rise in temperature and to flash into steam. The steam or vapor entering the condenser 6 forces the remaining air through the air line 4 and throttling passage 5 into the compression chamber 1 and fills up the condenser. The steam therein is then condensed in proportion to the rate of heat transmission through the transfer surface of the condenser, and the condensed electrolyte returns to the generating chamber 3, either directly in the one pipe unit or system or through return pipe 7 in the two pipe unit or system. During the course of operation some air, gases, steam and/or vapor or a mixture thereof flows constantly from the condenser 6 through the air line 4 and the throttling passage 5, but the length of the air line and the size of the opening in the passage are such that all vapor or steam passing at the maximum operating pressure is condensed before reaching the compression chamber 1.

The volume of steam or vapor condensed is at all times affected by the changes in the temperature of the heat absorbing element, whether air, gas or liquid, surrounding condenser 6.

As the heat absorbing medium rises in temperature there comes a point when the volume of steam condensed is smaller than that of the steam produced, the pressure then developed forcing the electrolyte out of generating chamber 3 in the primary circuit, through passage 8, into compression chamber 1 in which the air is thereby compressed. The consequent drop in the level of the electrolyte in the generating chamber decreases the surface of immersion of the electrodes and thereby the electric input, in the manner of the water rheostat, until the level has reached the point at which the electric current input is only that required for the production of steam in the exact quantity that can be condensed at the moment. It is obvious, of course, that any increase in the rate of condensation by a temperature decrease in the heat absorbing medium around condenser 6, reverses the process and increases accordingly the electric input until a new equilibrium is established.

The construction illustrated in Fig. 5 represents a type of electric steam condenser adapted for use in the heating of liquids, it embodying the essential elements referred to with respect to the structure of Figs. 1, 2 and 3, and bearing the same reference numerals, except that in the instance of Fig. 5 the compressing chamber surrounds the generating chamber.

In the diagrammatic views of Figs. 9, 10, 11 and 12 means are illustrated whereby the electric steam condenser of the sealed type can be amplified by the use of a group of condenser cores of both the space and liquid heating types, but with only one heat generating element, one compressor, one common air line and one steam line 11, with and without return lines.

A relief valve, indicated at 10, may if desired be provided.

Figs. 13 and 14 show constructions similar to those of Figs. 1, 2, 3 and 4, with the difference that the compression chamber has been removed from the casing enclosing the generating chamber and placed above the condenser core. Fig. 14 further shows that the throttling passage placed in the air line can be provided, if so desired, with an element 9 that is controlled by expansion, pressure or other means which will allow air and gases to flow to the compression chamber while withholding steam and/or vapor therefrom.

Variations within the spirit and scope of my invention are equally comprehended by the foregoing disclosure.

I claim:—

1. Apparatus for providing a balanced heat exchange system comprising a casing, an electric steam generator positioned therein and containing an electrolyte, said casing having a compression chamber in its upper portion, means intermediate said generator and chamber for condensing the steam, an air line between the condensing means and chamber, said air line including throttling means, and means of communication between the chamber and generator.

2. Apparatus for providing a self regulating, balanced heat exchange system comprising an electric steam generating chamber containing an electrolyte, a compressing chamber positioned above said generating chamber, a condenser located intermediate said generating and compressing chambers, an air line communicating from said condenser to said compressing chamber, throttling means included in said air line, means of communication between said compressing and generating chambers, and return means between said condenser and generating chamber.

3. Apparatus for providing a self regulating, balanced heat exchange system comprising an electric steam generating chamber containing an electrolyte, electrodes immersed in said electrolyte, a compressing chamber arranged above said generating chamber, a condenser located intermediate said generating and compressing chambers, an air line communicating between said condenser and compressing chamber, throttling means included in said air line, and means of communication between said compressing and generating chambers whereby a variation in the developed pressure governs the amount of electric current employed to maintain the equilibrium.

4. Apparatus for providing a balanced heat exchange system including a primary circuit embodying an electric steam generator chamber, a condenser connected therewith and means of communication between said chamber and condenser, and a secondary circuit comprising an air line connecting said condenser and a compression chamber and being joined to said generator chamber, the arrangement being such that an equilibrium is maintained between the steam pressure in the primary circuit and the pressure of the air cushion in the secondary circuit.

5. Apparatus for providing a self regulating, balanced heat exchange system comprising an electric steam generating chamber containing an electrolyte, electrodes immersed in said electrolyte, a compressing chamber in communication with said generating chamber, a condenser located intermediate said chambers, an air line communicating between said condenser and compressing chamber, throttling means included in said air line, said structure including a primary and a secondary circuit, and control means therefor whereby an equilibrium is maintained between the steam pressure in said primary circuit and the pressure of the air cushion in the secondary circuit.

LOUIS G. DE KERMOR.